United States Patent
Hannel et al.

(10) Patent No.: US 7,561,559 B2
(45) Date of Patent: Jul. 14, 2009

(54) HARDWARE TIME STAMPING AND PROCESSOR SYNCHRONIZATION

(75) Inventors: Clifford Hannel, Thousand Oaks, CA (US); Jan Olderdissen, Thousand Oaks, CA (US); Doug Schafer, Agoura Hills, CA (US); Roger Standridge, Los Angeles, CA (US)

(73) Assignee: IXIA, Calabasas, CA (US)

(*) Notice: Subject to any disclaimer, the term of this patent is extended or adjusted under 35 U.S.C. 154(b) by 466 days.

(21) Appl. No.: 11/095,096

(22) Filed: Mar. 30, 2005

(65) Prior Publication Data

US 2006/0239300 A1    Oct. 26, 2006

(51) Int. Cl.
    *H04J 3/06* (2006.01)
(52) U.S. Cl. .................. 370/350; 370/503
(58) Field of Classification Search ............ 370/350, 370/401, 503
    See application file for complete search history.

(56) References Cited

U.S. PATENT DOCUMENTS

| | | | |
|---|---|---|---|
| 5,450,394 A * | 9/1995 | Gruber et al. ............ 370/253 |
| 5,477,531 A | 12/1995 | McKee | |
| 5,878,032 A | 3/1999 | Mirek et al. | |
| 5,987,633 A | 11/1999 | Newman | |
| 6,148,051 A * | 11/2000 | Fujimori et al. .......... 375/356 |
| 6,252,891 B1 * | 6/2001 | Perches ................... 370/503 |
| 6,446,121 B1 | 9/2002 | Shah | |
| 6,545,979 B1 | 4/2003 | Poulin | |
| 6,717,917 B1 | 4/2004 | Weissberger et al. | |
| 7,058,071 B1 * | 6/2006 | Myles et al. ............. 370/419 |
| 7,123,616 B2 | 10/2006 | Weissberger et al. | |
| 2003/0016627 A1 * | 1/2003 | MeLampy et al. ........ 370/235 |
| 2003/0161321 A1 * | 8/2003 | Karam et al. .......... 370/395.21 |

OTHER PUBLICATIONS

VirtualVTR, Recording Preferences: MTC overrides Video Hardware timestamp, website: http://www.virtualvtr.com/documentation/recordprefs.html, 2003.

Brix Networks, Time Synchronization Options for Brix Verifiers, Product Specification Sheet, 2005.

Brix Networks, GPS, CDMA, and NTP Alternatives Acurately Measure One-Way Network Delay, VoIP Quality, and Video Performance, Brix Networks News and Events, Press Release. Sep. 30, 2002.

(Continued)

Primary Examiner—Seema S Rao
Assistant Examiner—Mon Cheri S Davenport
(74) Attorney, Agent, or Firm—SoCal IP Law Group LLP; Steven C. Sereboff; Mark A. Goldstein

(57) ABSTRACT

Hardware time stamping is disclosed. In a method, a transmit time stamp may be added to an outgoing data unit in hardware prior to transmitting the outgoing data unit over a communications medium. The outgoing data unit may be received from a processor and may be intended for a node. The outgoing data unit may be transmitted over the communications medium to the node. An incoming data unit may be received over the communications medium. A receive time stamp may be added to the incoming data unit in hardware before the incoming data unit is provided to the processor. The method may be achieved on a hardware device included on a board in a network testing system.

29 Claims, 6 Drawing Sheets

OTHER PUBLICATIONS

Brix Networks, Brix 2500 Verifier and BrixWorx 2.0 Software Deliver Next-Generation Performance Monitoring Capabilities to Service Provider and Enterprise Networks, Brix Networks News and Events, Press Release. Mar. 25, 2002.

Shu, Z. and Kobayashi, K., A Hardware Timestamper for One-Way Delay Measurements, IPPM WG Meeting, IETF60, San Diego, Aug. 2, 2004.

Hedayat, K. and Cucchiara, J., An Overview of Brix Network's One Way Delay Performance Test, IPPM WG Meeting, Mar. 2001.

* cited by examiner

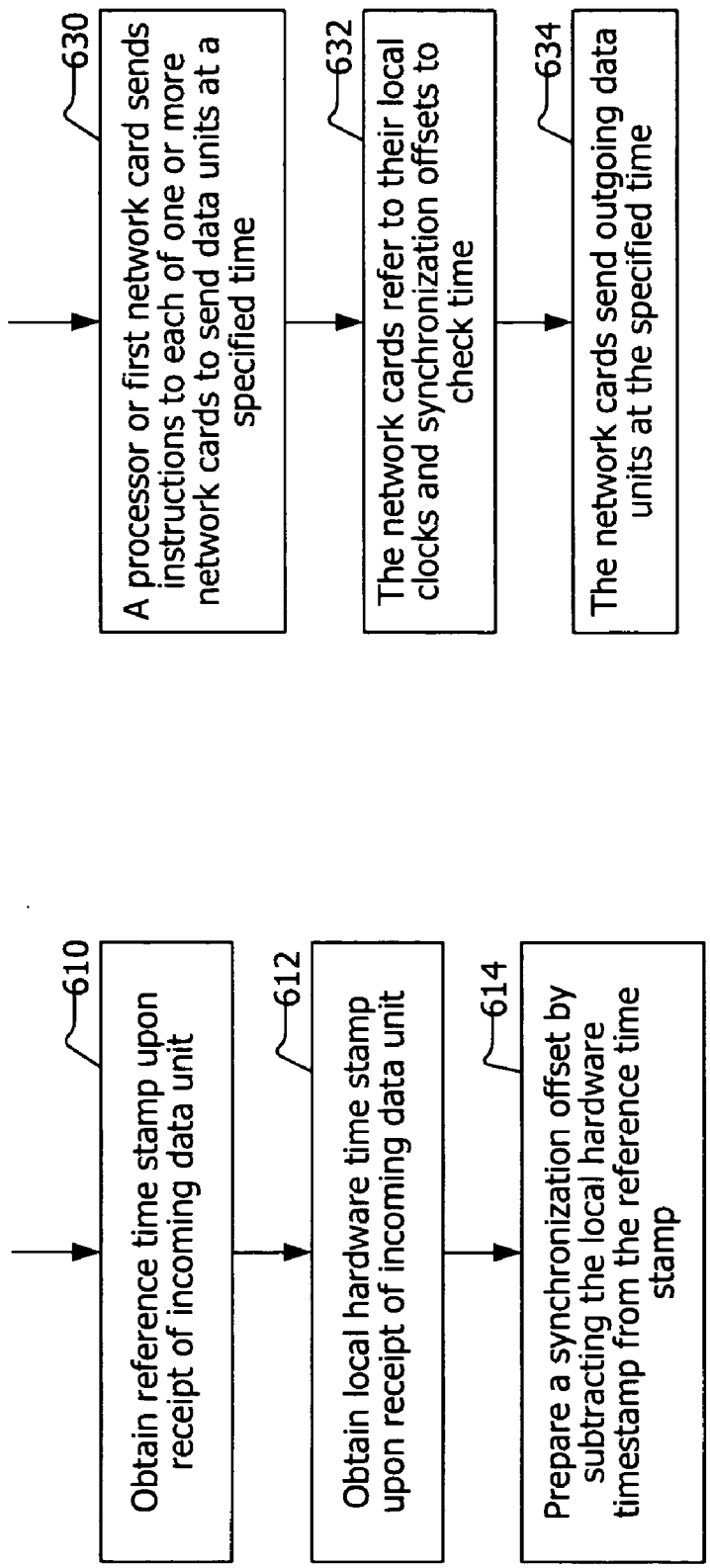

HARDWARE TIME STAMPING AND PROCESSOR SYNCHRONIZATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to network communications, network testing and network traffic analysis.

2. Related Art

Networks such as the Internet carry a variety of data communicated using a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The amount of delay between nodes or other devices in a network may be evaluated by network testing systems. The network testing systems may be used to evaluate the how well a network or portion of thereof handles streaming media and voice communications.

DESCRIPTION OF THE DRAWINGS

FIG. 6A is a flow chart of a method of determining a synchronization offset for a network capable device using hardware time stamping.

FIG. 6B is a flow chart of a method of synchronized transmission of data units enabled using hardware time stamping.

DETAILED DESCRIPTION OF THE INVENTION

Throughout this description, the embodiments and examples shown should be considered as exemplars, rather than limitations on the apparatus and methods described.

A System

Figure 1:
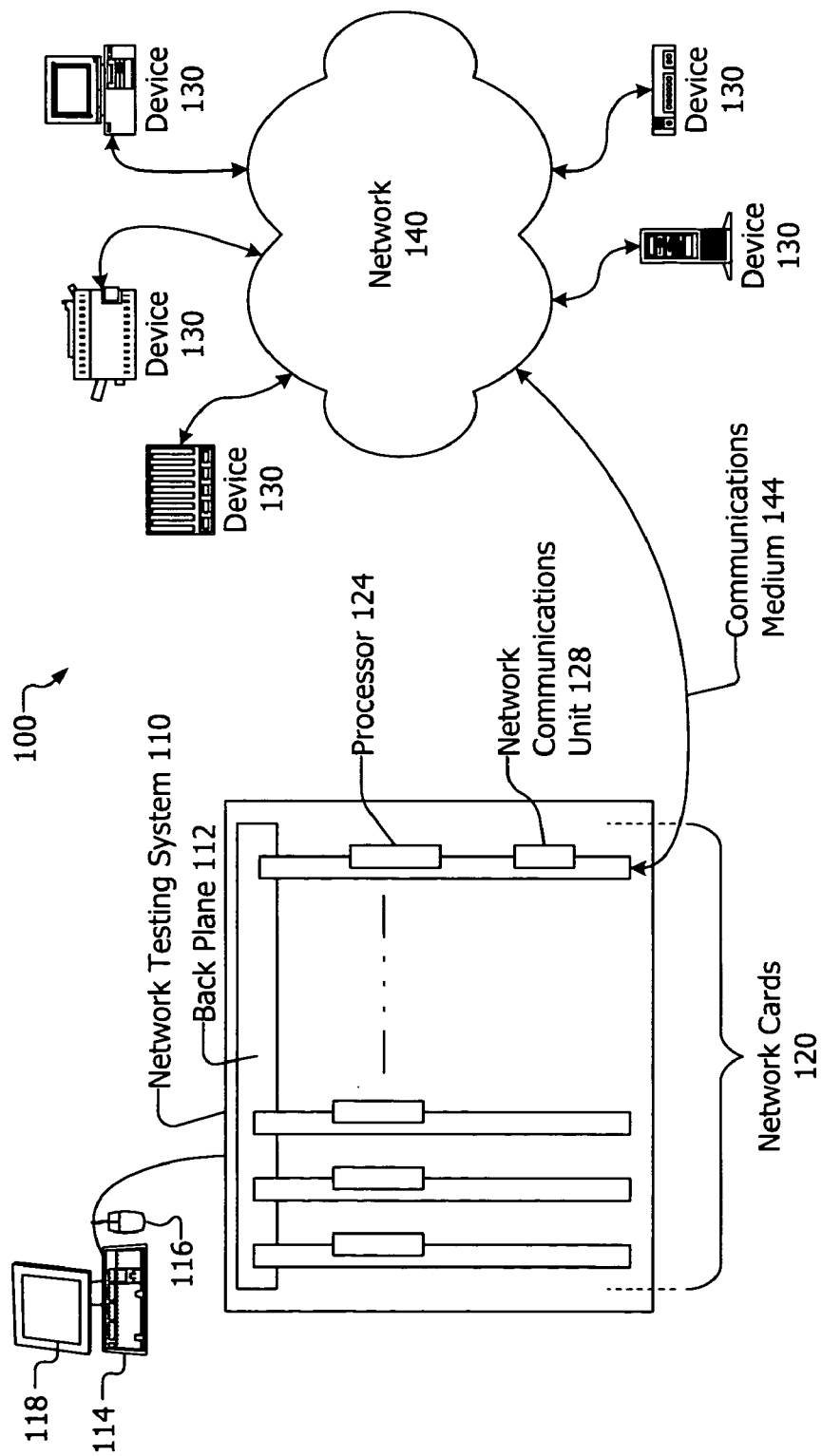
FIG. 1 is a block diagram of an environment in which hardware time stamping is included in a network testing system.

FIG. 1 is a block diagram of an environment 100 in which a method of hardware time stamping is included in a network testing system. The environment 100 includes network testing system 110 coupled via a network card 120 to a network 140 over a communications medium 144. The network testing system 110 may include or be one or more of a performance analyzer, a conformance validation system, a network analyzer, a packet blaster, a network management system, a combination of these, and/or others. The network testing system 110 may be used to evaluate or measure characteristics and performance of a communication line or system, including the throughput of network traffic, the number of dropped packets, jitter, and many others. Such testing may be used to evaluate the Mean Opinion Score (MOS) of voice transmission over a network or portion thereof. The network testing system may be used to evaluate the performance of servers, networking devices such as, for example, routers, gateways, load sharers, and others, as well as network applications and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although only one connection over communications medium 144 is shown, each of the network cards 120 may be connected with network 140 over a communications medium. The communications medium may be, for example, wire lines such as an Ethernet cable, fibre optic cable, and coaxial cable, and may be wireless.

The network testing system 110 and the network cards 120 may support one or more well known higher level communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Session Initiation Protocol (SIP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others. The network cards 120 may be referred to as blades, particularly when a processor is included on the network card.

The network cards 120 may include one or more processors 124 and one or more network communications units 128. In another embodiment, the network cards 120 may have no processors 124 and may include one or more network communications units 128. In the embodiment in which the network cards do not include a processor, the processing may be performed by a processor on the motherboard, on another card, on the backplane or by a remote or external unit. When the network card 120 includes two or more network communications units 128, the network card 120 is in effect two or more network capable devices. That is, a network card 120 having n network communications units 128 may function as n network capable devices.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The hardware time stamping described herein may be implemented using the network communications unit 128. The network communications unit 128 may support one or more communications protocols in hardware. The network communications unit 128 may include a network interface through which the network card 120 may transmit and/or receive communications over the network 140.

The back plane 112 may serve as a bus or communications medium for the network cards 120. The back plane 112 may also provide power to the network cards 120.

The network testing system 110 may have a computer (not shown) coupled thereto. The computer may be local to or remote from the network testing system 110. In another embodiment, the network testing system 110 may include a CPU on a card, motherboard or backplane that allows the chassis to also serve as a computer workstation. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 130 in the network 140. The network testing system 110 may be used to test and evaluate the network 140 and/or portions thereof, network capable devices 130, applications running on network capable devices 130, and/or services provided by network 140 and/or network capable devices 130. The network testing system 110, the network cards, and the network communications units 128 may all be network capable devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for data units to travel. Each node may be a network capable device as described below.

Communications on the network 140 may take various forms, including frames, cells, datagrams, packets, higher level logical groupings, or other units of information, all of which are referred to herein as data units. Those data units that are communicated over a network are referred to herein as network traffic. The network traffic may include data units that represent electronic mail messages, streaming media such as music (audio) and video, telephone (voice) conversations, web pages, graphics, documents, and others.

The network capable devices 130 may be devices capable of communicating over the network 140 and/or listening to, injecting, delaying, dropping, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment network such as analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

Figure 2:
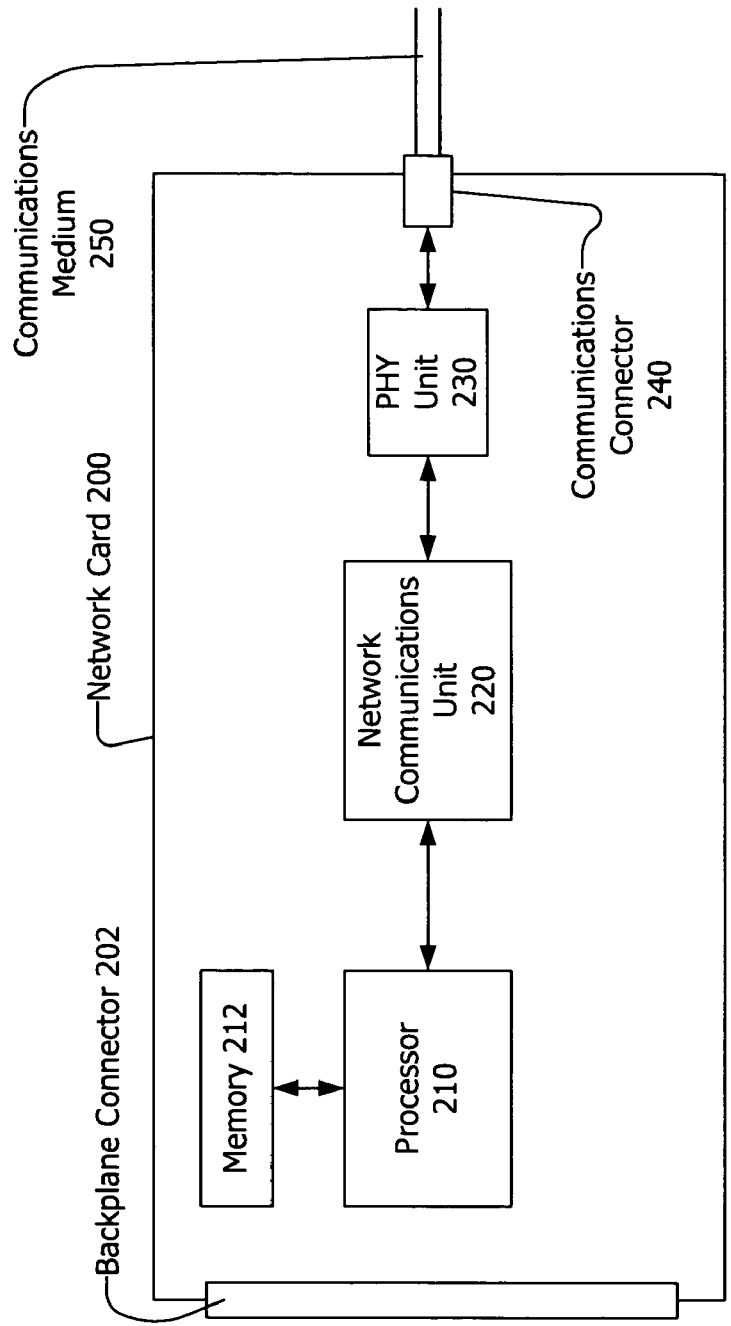
FIG. 2 is a block diagram of a network card in which hardware time stamping is implemented in hardware.

FIG. 2 is a block diagram of a network card 200 in which hardware time stamping is implemented. The network card 200 may include hardware, software, firmware, and/or a combination thereof. The network card may include a processor 210, a network communications unit 220, a PHY unit 230, a memory unit 212, a backplane connector 202, and a communications connector 240. In another embodiment, there are no processors 210 in the network card 200. The network card 200 may have one or more network communications units 220 and a corresponding number of both PHY units 230 and communications connectors 240. The network card 200 may also have one or more memory units 212 and one or more processors 210 included thereon. The network card 200 may include an operating system or a real-time operating system.

The backplane connector 202 may allow the network card 200 to be coupled with a network testing system such as networking testing system 110. The memory 212 may be, for example, random access memory (RAM), and may be coupled with processor 210. The processor 210 may be a multipurpose processor, such as, for example, a PowerPC processor available from IBM, Inc., and may be a specialized processor. The processor 210 may be coupled with the network communications unit 220. The processor is capable of executing instructions which may be located in a local memory, other storage medium, or other local or remote storage device. In one embodiment, the network card 200 includes no processor, and commands are received from a processor included on another card, on a mother board, or on the backplane.

The network card 200 may include and/or have access to local and/or remote memory, storage media and storage devices. Instructions to be executed by the processor may be stored on and executed from any local or remote machine readable medium or storage device. A machine readable medium includes, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, DVD drives, flash memory devices, and others.

The network communications unit 220 may include one or more circuits, chips, logic, firmware and/or instructions that allow for communication over a network and the inclusion of a time stamp with or in incoming and outgoing data units. The network communications unit 220 may provide support for the data link layer (DLL) of the OSI model and may provide support for two sub-layers of the DLL, a Media Access Control (MAC) layer and a Logical Link Control (LLC) layer. In one embodiment, the network communications unit 220 provides support for only the MAC layer. The network communications unit 220 may be implemented as one or more FPGAs. The FPGA may include or be attached to a general purpose processor, RAM, and other devices or components. The network communications unit 220 may also be implemented or included on an ASIC, a silicon device, an integrated circuit, a general purpose processor, a specialized processor such as a network processor, or other device. The network communications unit 220 may be coupled with the PHY unit 230. The network communications unit 220 is set forth in more detail in FIG. 3.

By removing the time stamping function from a processor such as processor 210 and placing it in a hardware device or devices such as network communications unit 220, highly accurate timing information may be included with or in incoming and outgoing data units. When implementing time stamping using a processor, latency is typically introduced. The latency may be introduced into outgoing data units while the processor spends time processing and adding validation information to the outgoing data unit after a time stamp has been added by the processor to the outgoing data unit. In addition, processor introduced latency may be caused by interrupts, polling, and process synchronization. Processor introduced latency causes jitter in data units.

As described herein, processor introduced latency is reduced by implementing the time stamping and validation functionality in a hardware unit such as network communications unit 220 that is separate from the processor. In one example implementation, the hardware time stamping described increases the accuracy of jitter measurement to tens of nanoseconds. This delay, tens of nanoseconds, is three orders of magnitude faster than the microseconds required of a processor to prepare and add validation information to a data unit containing a time stamp. By having more accurate time stamps included in the data units, data unit jitter may be more accurately measured. Other data unit timing measurements may also be more accurately prepared.

The increased quality jitter measurement and other measurements resulting from the time stamping described herein is particularly suited to evaluating networks that include streaming media, streaming music (audio), streaming video, and voice communications traffic, such as, for example, voice over the Internet Protocol (VOIP). The measurements that may be obtained more accurately and with higher quality include VOIP MOS scores, video MOS scores, and other video transmission, streaming media, streaming audio, and real-time communications quality measurements.

The PHY unit 230 provides for and supports lower level communications according to the Open System Interconnection (OSI) model physical or PHY layer. The PHY unit 230 provides for and supports one or more lower level communications as set forth above, including Ethernet, ATM, SONET, and various wireless standards including, for example, IEEE 802.11 (Wi-Fi) and 802.16 (WiMAX). The PHY unit 230 may include support for sub-layers within the PHY layer of the OSI model. These layers may be the Physical Coding Sub-layer (PCS), the Physical Medium Attachment sub-layer (PMA), and the Physical Media Dependent sub-layer (PMD).

The PHY unit 230 may be coupled with a communications medium 250 via communications connector 240. The communications connector 240 may be coupled between the network communications unit 220 and the communications medium 250. The communications medium 250 may be a wire such as Ethernet cabling, coaxial cable, fibre optic cable, and others, and may be wireless.

Additional and fewer units, hardware and firmware may be included in the network card 200 to achieve the hardware time stamping described herein.

Figure 3:
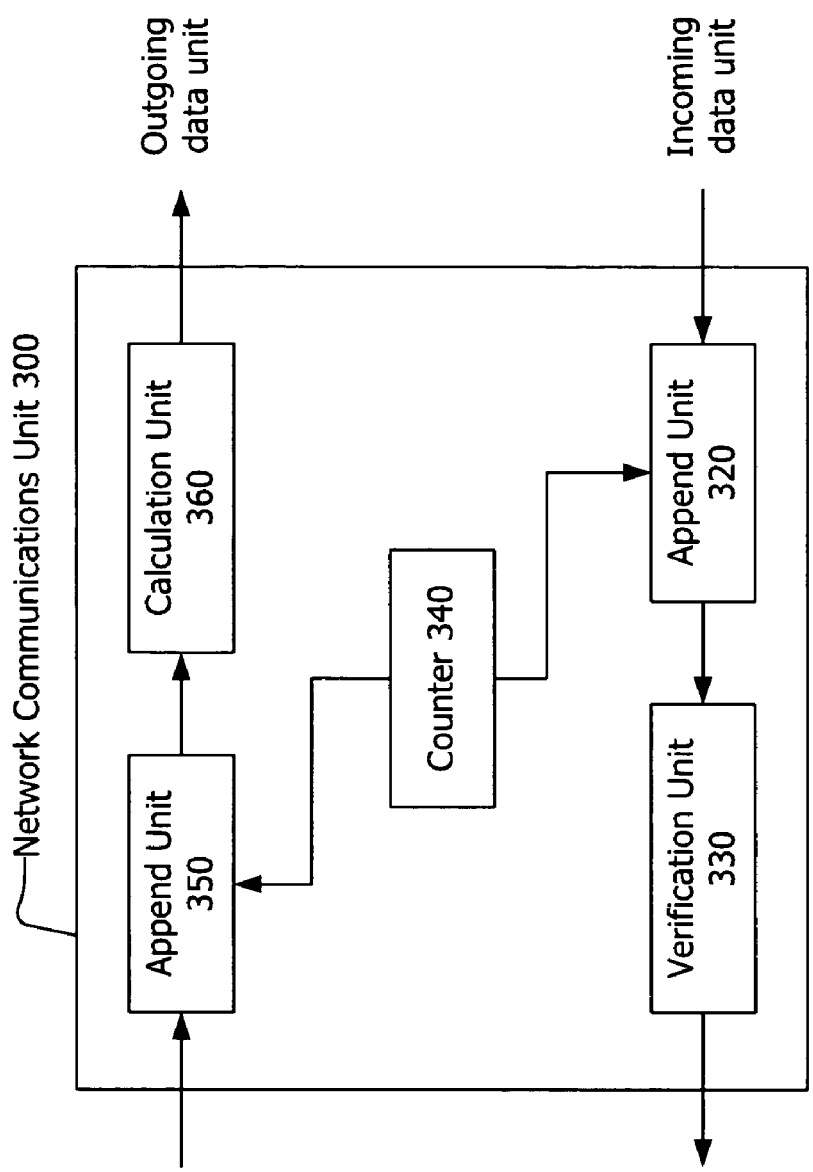
FIG. 3 is a block diagram of a network communications unit in which time stamping is implemented.

FIG. 3 is a block diagram of a network communications unit 300 in which hardware time stamping may be implemented. Network communications unit 300 may be configured as shown to add a time stamp in hardware to incoming and outgoing data units, to only incoming data units, and to only outgoing data units. The time stamp may be added surreptitiously to communications between two nodes, such as, for example a processor and a device under test. In one example, a socket connection between a processor and a device under test may exist, and one or more network communications units may add time stamp information to the incoming and/or outgoing data units originating with or intended for the processor.

When the network communications unit 300 receives an incoming data unit, in one embodiment, the incoming data unit is intended for and directed to a processor coupled with the network communications unit 300. That is, the incoming data unit is not directed to the communications unit 300 as its final destination. Upon receipt of the data unit by the communications unit 300, an append unit 320 obtains a time stamp, the current time, from counter 340. As used herein, "upon receipt" means at a fixed time after receipt and/or immediately upon receipt. As used herein, "immediately" means as soon as practicable, in the shortest amount of time possible, without delay. Append unit 320 may upon receipt or later add the time stamp to the data unit or add the time stamp to meta data associated with the data unit. A verification unit 330 may upon receipt or later prepare verification information including evaluating a checksum of the data unit, calculating and verifying the data unit using a cyclic redundancy check (CRC), evaluating the frame check sequence (FCS), and/or performing other error detection, verification and validation of the incoming data unit.

When the network communications unit 300 receives an outgoing data unit, the outgoing data unit, in one embodiment, is addressed to, directed to and otherwise intended for a device under test, network capable device or node. Upon receipt of the outgoing data unit, The append unit 350 may append, insert, or otherwise add a time stamp to the outgoing data unit. The append unit 350 obtains the time stamp, the current time, from counter 340. This time stamp is referred to as a hardware time stamp. A calculation unit 360 may upon receipt or later prepare verification information which may include processing a checksum, CRC value, FCS and/or preparing other error detection, verification and validation information for the outgoing data unit.

Other functional units pertaining to MAC layer and other communications processing in the network communications unit 300 are not discussed herein as they are known to those skilled in the art and so not as to distract from the pertinent features of the hardware time stamping described herein. Additional and fewer units, hardware and firmware may be included in the network communications unit 300 to achieve the hardware time stamping described herein.

The Methods

The methods described below in FIGS. 4A, 4B, 5, 6A and 6B may be implemented on one or more FPGAs and/or other hardware devices, such as, for example, network communications units 220 and 300 of network cards 120 and 200 in a network testing system 110, as shown in FIGS. 1, 2 and 3.

Figures 4A, 4B:
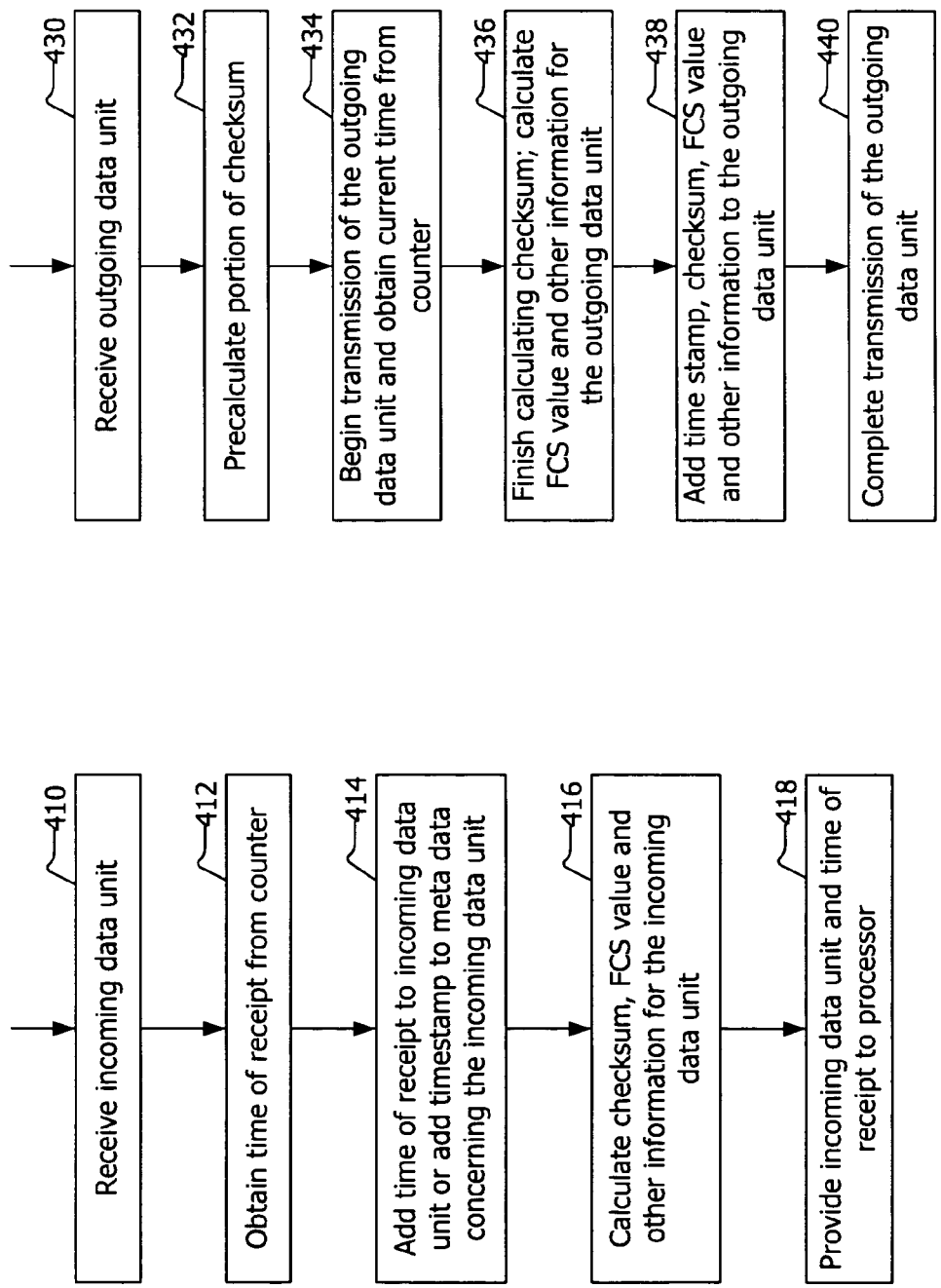
FIG. 4A is a flow chart of a method of hardware time stamping when receiving data units.
FIG. 4B is a flow chart of a first method of hardware time stamping when sending data units.

FIG. 4A is a flow chart of a method of hardware time stamping when receiving data units, and FIG. 4B is a flow chart of a first method of hardware time stamping when sending data units. Referring to FIG. 4A, an incoming data unit is received, as shown in block 410. The incoming data unit may be intended for or directed to, for example, a processor. A time of receipt for the data unit is obtained from a counter, as shown in block 412. The time of receipt may be added to the data unit itself or to meta data concerning the incoming data unit, as shown in block 414. A checksum, CRC value, FCS and other verification information may be calculated for the incoming data unit, as shown in block 416. Other forms of error detection, verification and validation may also be used and calculated. The incoming data and the time of receipt, either included with the data unit or in accompanying meta data, are provided to a processor, as shown in block 418. According to this method, the time stamp in the form of the time of receipt is obtained upon receipt of the data unit and before any processing of the data unit such as that performed in block 416.

Referring to FIG. 4B, an outgoing data unit is received, as shown in block 430. The outgoing data unit may be received from a processor and may be addressed to, for example, a node, a network capable device, or a device under test. Upon receipt of the outgoing data unit, a portion of a checksum for the outgoing data unit may be precalculated, as shown in block 432. Transmission of the outgoing data unit begins while, concurrently or shortly thereafter, a current time for the data unit to be used as a time stamp is obtained from a counter, as shown in block 434.

The computation of the checksum may be finished, and the FCS and/or other verification information may be calculated for the outgoing data unit as shown in block 436. The time stamp, checksum, FCS and other verification information are added to the outgoing data unit, as shown in block 438. The term "added" as applied to the time stamp includes, appending, pre-pending, post-pending or otherwise including the time stamp with the outgoing data unit. The term "added" as applied to the checksum, FCS and other verification information includes appending, pre-pending, post-pending, inserting or otherwise including the information with the outgoing data unit. Transmission of the outgoing data unit including the time stamp and checksum, FCS and/or other verification information, is completed, as shown in block 440.

According to this method, the time stamp representing the time of transmission for the outgoing data unit is obtained immediately or nearly immediately after any initial processing performed concerning the outgoing data unit such as that performed in block 432 and as close as practicable in time to providing the outgoing data unit to the PHY unit in block 434.

In another embodiment, the time stamp included with a data unit is for the previously transmitted data unit. That is, each successive data unit includes the time stamp of the immediately previously transmitted data unit. In this embodiment, block 434 would be amended to read that the time stamp from the prior data unit is retrieved from storage, such as in a register or a memory location. In addition, a new block, block 439 would be added in which the current time from the counter is obtained and placed in storage, such as in a register or a memory location. In this embodiment, a corresponding receiving unit is configured to process the data units based on the time stamp included in the next or subsequent data unit.

The methods described in FIGS. 4A and 4B may be used to obtain time stamps for use in calculating the one way and round trip time it takes a data unit to travel between a source and a destination, and may also be used to compute the one way and round trip delay incurred. These computations may be referred to as one way and round trip time, latency and delay. Other calculations that may be made using the time stamps include data unit to data unit (or packet to packet) jitter and the gap between data units (or packets). Measurements within a data unit (or packet), such as the start and end time for transmission of a single data unit (or packet) may also be computed. Network traffic jitter may be computed by subtracting testing system introduced jitter. The source of the data units may be a network testing system and the destination of the data units may be a network capable device as defined herein. In another embodiment, the source and destination of data units may be two network capable devices. Outgoing and incoming time stamps of the data units may be obtained according to FIGS. 4A and 4B.

The network testing system may compare the outgoing and incoming time stamps from multiple data units sent to or through a particular device under test to evaluate the one way or round trip delay in communicating with the device under test and/or to evaluate other performance characteristics of the device under test. For example, data units sent to a device under test may request and/or require processing according to a particular function, application or protocol. Other analysis and evaluation of network traffic, network applications, and network capable devices may be performed using the time stamping described herein.

Figure 5:
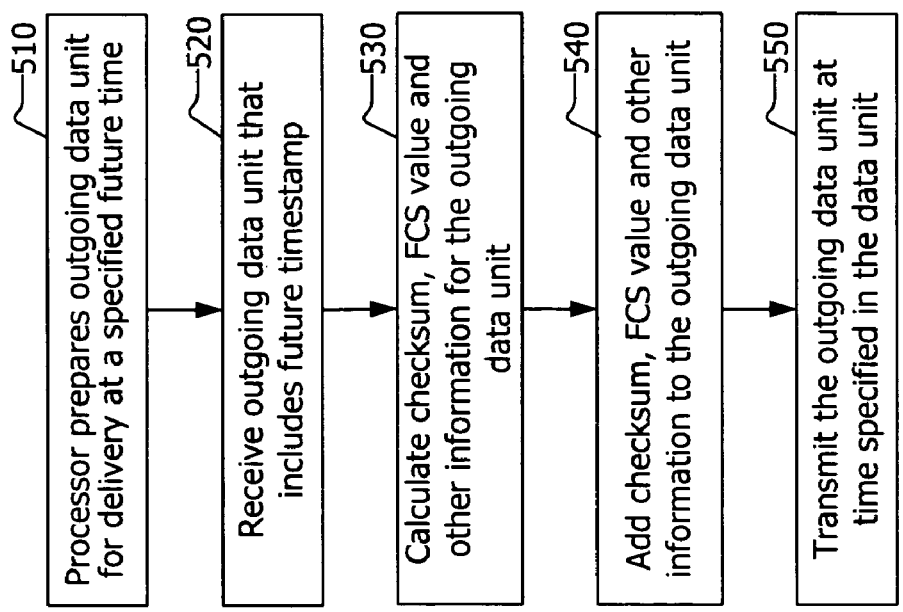
FIG. 5 is a flow chart of a second method of hardware time stamping when sending data units.

In another embodiment, referring to FIG. 5, there is shown a flow chart of a second method of hardware time stamping when sending data units. In this embodiment, a processor prepares an outgoing data unit for delivery at a specified future time, as shown in block 510. The future time may be referred to as a future time stamp. The future time stamp may be stated as a specific time in the outgoing data unit, for example, send at 11:10 a.m. on a specific date or the current day; and as a transmission delay, for example, send in n seconds, send in m minutes, and/or x days, etc. An outgoing data unit that includes the future timestamp is then received, as shown in block 520. A checksum, FCS value and other information for the outgoing data unit may be calculated, as shown in block 530. The checksum, FCS value and other information may be added to the outgoing data unit, as shown in block 540. The time stamp may also be added to the outgoing data unit if the future time stamp was included in meta data in block 510. The outgoing data unit may be transmitted at the time specified in the future time stamp of the outgoing data unit, as shown in block 550. A local clock may be regularly checked, or other techniques may be used to obtain the time.

FIG. 6A is a flow chart of a method of determining a synchronization offset for a network capable device using hardware time stamping. In one embodiment, the method shown in FIG. 6A may be initiated periodically by a device, network card or network communications unit to ensure that it is synchronized with an external reference time. Upon receipt of an incoming data unit, a reference time stamp is obtained, as shown in block 610. Upon receipt of the incoming data unit, a local hardware time stamp is obtained, as shown in block 612. The actions taken in blocks 610 and 612 may occur concurrently, nearly simultaneously, or in reasonably close temporal proximity.

The reference time stamp may be referred to as a software time stamp as it may be obtained by a software call to an external reference time or time source, such as, for example, a satellite broadcast clock signal, cellular telephone clock signal, global positioning system (GPS) signal, or other external signal, or by reference to a local crystal oscillator which is set by an external time source or clock. The local time stamp may be referred to as a hardware time stamp as it is obtained from a local hardware device such as a counter. A synchronization offset is computed by subtracting the local time stamp from the reference time stamp, as shown in block 614. The synchronization offset may then be used to synchronize the local device with the reference time.

In one embodiment, the computation of a synchronization offset is performed once each time a network communications unit, network card, or device powers up. In one embodiment, the computation of a synchronization offset is performed whenever the local hardware device or counter is reset.

In an alternate embodiment, the synchronization is achieved independent of network communications. In this alternate embodiment, the network communications unit requests a reference time and a local time nearly simultaneously. The network communications unit then computes the synchronization offset based on the difference between the reference time stamp and the local time stamp.

When multiple network capable devices, network cards, network communications units use the technique described in FIG. 6A, each of the network capable device may perform tasks according to a time based on a reference clock. For example, each of the network communications units in a group of network testing systems may be instructed to send packets at a designated time. To achieve this, each of the network communications units uses its own synchronization offset to create a local time or relative time at which the packet should be sent.

FIG. 6B is a flow chart of a method of synchronized transmission of data units enabled by using hardware time stamping. This method presumes that a network card or other network capable devices have prepared synchronization offsets according to the method described in FIG. 6A. A first network card, a processor or network capable device sends instructions to each of one or more network cards and/or network capable devices to send data units at a specified time, as shown in block 630. These instructions may be issued by an application program or other software executing on a processor on the first network card. The network cards refer to their local clocks and synchronization offsets to check the time, as shown in block 632. The network cards send outgoing data units at the specified time, as shown in block 634. The specified time is evaluated on each network card using its local synchronization offset. Application of the synchronization offset to the specified time may produce a relative time or relative time of day. Using this method, a packet storm or high volume of network traffic may be transmitted simultaneously by a group of network cards in a network testing system or one or more network testing systems.

This simultaneous network traffic may be used to evaluate the functioning of a network device, network server, network segment, network communications medium and/or network application under the extreme condition of concurrently receiving an excessively large amount of network traffic.

With regard to FIGS. 4A, 4B, 5, 6A and 6B, additional and fewer steps may be taken, and the steps as shown may be combined or further refined to achieve the methods described herein.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

It is claimed:

1. A method comprising:

receiving in a network communications unit an outgoing data unit from a processor, the outgoing data unit intended for a node;

adding a transmit time stamp to the outgoing data unit in the network communications unit prior to transmitting the outgoing data unit over a communications medium, the adding including the network communications unit performing the following actions in the following order beginning calculating verification information for the outgoing data unit, wherein the verification information includes at least one from the group including a checksum, a cyclic redundancy check (CRC) and a frame check sequence (FCS)

beginning transmission of the outgoing data unit over the communications medium to the node, obtaining a current time from a counter, adding the current time as the transmit time stamp to the outgoing data unit, completing calculating the verification information for the outgoing data unit, adding the verification information to the outgoing data unit, completing transmission of the outgoing data unit over the communications medium to the node;

the network communications unit receiving over the communications medium from the node an incoming data unit intended for the processor;

appending a receive time stamp to the incoming data unit in the network communications unit before the incoming data unit is provided to the processor;

the network communications unit providing the incoming data unit to the processor.

2. The method of claim 1 wherein the transmitting comprises:

the network communications unit providing the outgoing data unit to a physical (PHY) layer unit.

3. The method of claim 1 wherein appending a receive time stamp comprises:

the network communications unit obtaining a current time from a counter the network communications unit adding the current time as the receive time stamp to the incoming data unit.

4. The method of claim 1 further comprising:

the network communications unit calculating verification information for the incoming data unit.

5. The method of claim 1 further comprising:

the processor computing a quality score for a communication over the communications medium based on the transmit time stamps and the receive time stamps included in a plurality of data units, the communication including at least one from the group comprising a voice communication, a streaming media, a streaming audio, and a voice over internet protocol (VOIP) communication.

6. The method of claim 1 further comprising:

the processor computing a jitter for a network communication.

7. The method of claim 1 further comprising:

the processor computing a round trip latency for a network communication based on the transmit time stamp and the receive time stamp included in the incoming data unit.

8. The method of claim 7 further comprising:

the processor computing a quality score for a voice communication over the communications medium based on the round trip latency for a plurality of network communications.

9. The method of claim 1 further comprising:

the processor computing a one way latency for a network communication based on the transmit time stamp and the receive time stamp included in the incoming data unit.

10. A method comprising:

appending a transmit time stamp to an outgoing data unit in a network communications unit prior to transmitting the outgoing network communication over a communications medium, the outgoing data unit originating with a processor and intended for a node, the appending including the network communications unit performing the following actions in the following order beginning calculating verification information for the outgoing data unit, wherein the verification information includes at least one from the group including a checksum, a cyclic redundancy check (CRC) and a frame check sequence (FCS)

beginning transmission of the outgoing data unit over the communications medium to the node, obtaining a current time from a counter adding the current time as the time stamp to the outgoing data unit completing calculating the verification information for the outgoing data unit adding the verification information to the outgoing data unit completing transmission of the outgoing data unit over the communications medium to the node.

11. The method of claim 10 wherein the transmitting comprises the network communications unit providing the outgoing data unit to a physical (PHY) layer unit.

12. The method of claim 10 further comprising receiving an incoming data unit directly over the communications medium appending a receive time stamp to the incoming data unit in the network communications unit before the incoming network communication is provided to the processor.

13. A network card including a processor and a network communications unit and coupled with a communications medium, the network card configured to perform actions comprising:

appending a transmit time stamp to an outgoing data unit in the network communications unit prior to transmitting the outgoing data unit over the communications medium, the outgoing data unit originating with the processor and intended for a node the network communications unit transmitting the outgoing data unit over the communications medium the network communications unit receiving an incoming data unit over the communications medium, the incoming data unit intended for the processor and originating with the node appending a receive time stamp to the incoming data unit in the network communications unit before the incoming data unit is provided to the processor the network communications unit providing the incoming data unit to the processor.

14. The network card of claim 13 wherein the appending a transmit time stamp comprises the network communications unit performing the following actions in the following order:

beginning calculation of verification information for the outgoing data unit, wherein the verification information includes at least one from the group including a checksum, a cyclic redundancy check (CRC) and a frame check sequence (FCS);

beginning transmission of the outgoing data unit over the communications medium to the node;

obtaining a current time from a counter;

adding the current time as the transmit time stamp to the outgoing data unit;

completing calculation of the verification information for the outgoing data unit;

adding the verification information to the outgoing data unit;

completing transmission of the outgoing data unit over the communications medium to the node.

15. The network card of claim 13 wherein the beginning transmission and the completing transmission include:

the network communications unit providing the outgoing data unit to a physical (PHY) layer unit included in the network card.

16. The network card of claim 13 wherein appending a receive time stamp comprises:

the network communications unit obtaining a current time from a counter the network communications unit adding the current time as the receive time stamp to the incoming data unit.

17. The network card of claim 13 wherein the network communications unit is configured to perform further actions comprising:

the network communications unit calculating verification information for the incoming data unit.

18. The network card of claim 13 configured to perform further actions comprising:

the processor computing a quality score for a communication over the communications medium based on the transmit time stamps and the receive time stamps included in a plurality of data units, the communication including at least one from the group comprising a voice communication, a streaming media, a streaming audio, a voice over internet protocol (VOW) communication.

19. The network card of claim 13 configured to perform further actions comprising:
   the processor computing a round trip latency for a network communication based on the transmit time stamp and the receive time stamp included in the incoming data unit.

20. The network card of claim 13 configured to perform further actions comprising:
   the processor computing a one way latency for a network communication based on the transmit time stamp and the receive time stamp included in the incoming data unit.

21. The network card of claim 13 configured to perform further actions comprising:
   the processor computing a jitter for a network communication.

22. The network card of claim 13 having multiple processors and multiple network communications units included thereon.

23. A network testing system including the network card of claim 13 included therein.

24. A network card comprising:
   a processor
   a memory coupled with the processor
   means for network communications, the means for network communications comprising
   means for appending a transmit time stamp to an outgoing data unit in hardware prior to transmitting the outgoing data unit over a communications medium, the outgoing data unit received from a processor and intended for a node
   means for transmitting the outgoing data unit over the communications medium
   means for receiving an incoming data unit over the communications medium
   means for appending a receive time stamp to the incoming data unit in hardware before the incoming data unit is provided to the processor
   means for providing the incoming data unit to the processor.

25. A network testing system having at least one network card of claim 24 included thereon.

26. The network card of claim 24 wherein the means for appending a receive time stamp comprises:
   means for obtaining a current time from a counter
   means for adding the current time as the receive time stamp to the incoming data unit.

27. The network card of claim 24 further comprising
   means for calculating verification information for the incoming data unit.

28. The network card of claim 24 wherein the means for appending a transmit time stamp to an outgoing data unit comprises
   means for obtaining a current time from a counter
   means for adding the current time as the transmit time stamp to the outgoing data unit
   means for calculating verification information for the outgoing data unit
   means for adding the verification information to the outgoing data unit.

29. The network card of claim 24 wherein the means for transmitting the outgoing data unit comprises
   means for providing the outgoing data unit to a physical (PHY) layer unit.

\* \* \* \* \*